3,035,084
MANUFACTURE OF DIMETHALLYL
PHTHALATES
John A. Garman, Baltimore, and William B. Tuemmler, Catonsville, Md., assignors to FMC Corporation, a corporation of Delaware
Filed Oct. 4, 1960, Ser. No. 60,466
8 Claims. (Cl. 260—475)

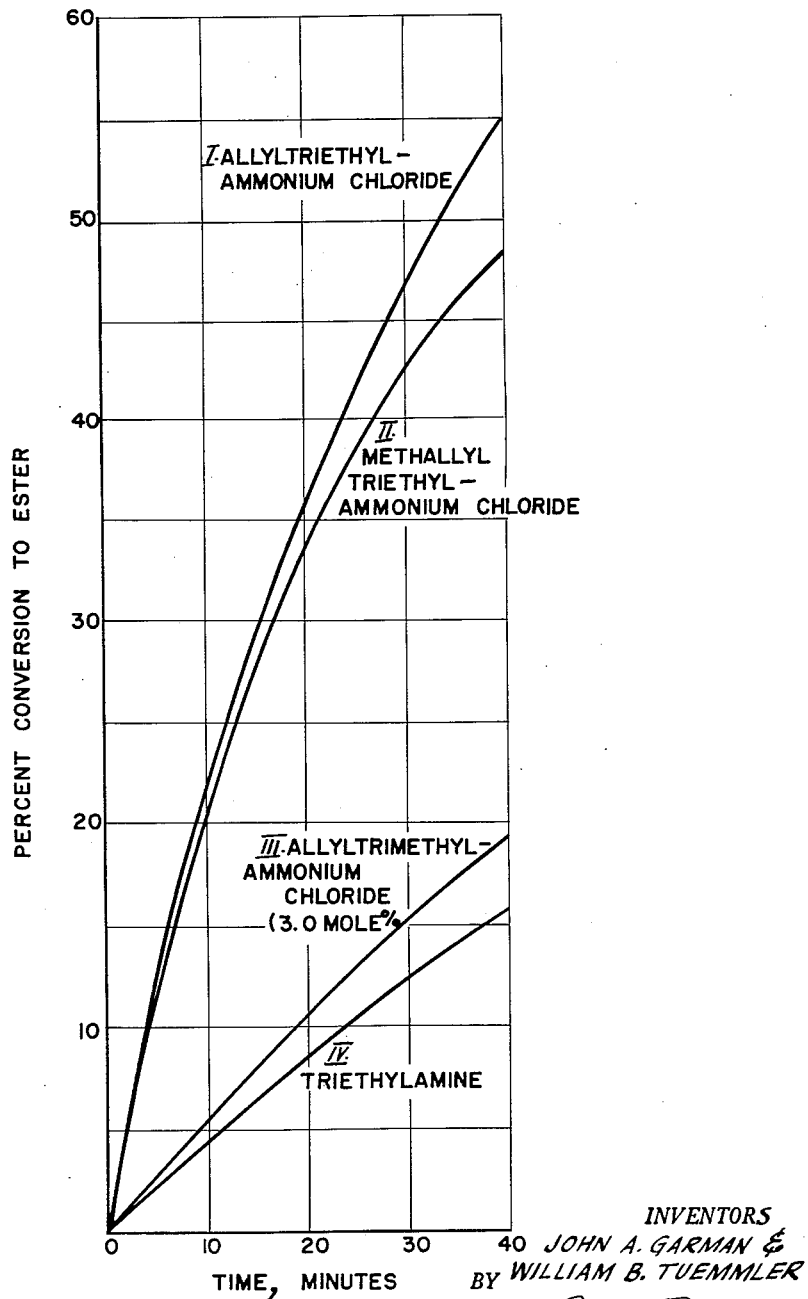

This invention relates to a new and improved method for the manufacture of dimethallyl phthalates, and particularly to a novel catalyst system for the reaction of salts of phthalic acids with methallyl halides to form dimethallyl phthalates.

It has long been known to produce esters of phthalic acids by reacting salts of these acids with organic halides in both aqueous and anhydrous systems, usually in the presence of an amine catalyst. Thus, for example, Canadian Patent 544,032 of Morris et al. describes the preparation of allyl esters of orthophthalic and isophthalic acids by reaction of the sodium salts of these acids with organic halides, the acid salt having a water content of at least 8% by weight, employing an amine catalyst, preferably a tertiary amine. This method is relatively satisfactory for the preparation of simple diallyl esters of orthophthalic and isophthalic acids. However, if this method is extended to the preparation of dimethallyl esters, it is found that the rate of the reaction is substantially slower, ordinarily about one fifth to one tenth of the rate observed for the preparation of diallyl esters.

It has now been discovered that the rate of reaction for the preparation of dimethallyl phthalates may be substantially accelerated, by catalyzing the reaction of methallyl chloride and alkali metal phthalates with allyl-, benzyl- or methallyltriethylammonium halide as catalyst. When these particular catalysts are used, instead of the tertiary amines of the prior art, the rate of the esterification reaction is greatly accelerated, so that the esterification reaction is often complete in a fraction of the time previously required for the preparation of methallyl phthalates. It is interesting to note that this phenomenon is not observed for the corresponding preparation of diallyl phthalates, in which case a fairly rapid reaction rate is obtainable using either tertiary or quaternary amines as catalysts.

It has further been discovered that the quaternary catalyst need not contain the methallyl radical in order to produce a pure methallyl ester. It is thus possible to select the quaternary catalyst which is most efficient from the standpoint of reaction rate: For example, at corresponding molar ratios, the reaction of methallyl chloride with the disodium phthalates is somewhat more rapid when allyl- rather than methallyltriethylammonium chloride is used as catalyst.

However, the increase in reaction rate using allyl-, benzyl- or methallyltriethylammonium chloride as catalyst is many fold greater than when the catalyst is a tertiary amine, and the rate is in fact also substantially increased over that observed with other quaternary catalysts, even such closely related quaternary catalysts as allyltrimethylammonium chloride. This unusual and specific catalyst activity is illustrated in the accompanying drawing, which graphically compares the effects of various catalysts on the reaction rate of methallyl chloride with disodium isophthalate, as will be described in detail.

The process of this invention is illustrated in the following equation for the reaction of disodium phthalate with methallyl chloride:

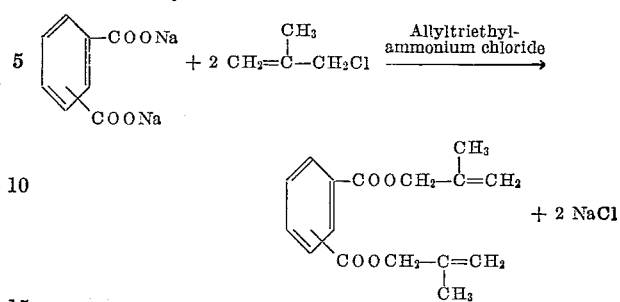

In the above formulae the phthalate may be derived from any of the isomeric phthalic acids, including orthophthalic, isophthalic and terephthalic acids. The salt is preferably an alkali metal salt, such as a sodium or potassium salt, and should be substantially anhydrous. Methallyl chloride is preferably used, because of its availability. The quaternary ammonium salt is either allyl-, benzyl- or methallyltriethylammonium halide, of which the chloride, bromide or iodide may be used.

The reaction requires two moles of methallyl halide to react with each mole of the phthalate salt. An excess of methallyl chloride may be present, to provide a solvent for the product and to compensate for any losses during the reaction. Unreacted methallyl chloride may be recovered or recycled. Either an inert solvent or a heel of the product may also be present, to control the reaction temperature and facilitate contact among the reactants. The reaction proceeds under completely anhydrous conditions, or in the presence of traces of water such as may normally be present in commercial reagents, which traces do not negate the substantially anhydrous reaction conditions. Since this is a heterogeneous reaction, stirring throughout the reaction is advisable to facilitate contact among the reactants.

The quaternary ammonium salt is used in catalytic amounts. Good yields and relatively rapid reaction rates are achieved using as little as 2 mole percent of catalyst. In general, increasing the amount of catalyst increases the reaction rate, and excellent results are obtained in the range of 2 to 10 mole percent of catalyst. Catalyst concentrations outside of this range may also be employed, depending upon the reaction conditions, but in general they offer no advantages.

The process may be conducted at atmospheric pressure, usually under reflux conditions, or at superatmospheric pressure. Reaction temperatures generally range from about 70° to 200° C., the reaction time decreasing as the temperature increases. At temperatures below about 70° C. the reaction is usually too slow to be practical. The upper temperature limit is controlled by convenience in operation and the stability of the components of the reaction mixture.

When the reaction is complete the product may be separated by standard procedures.

The invention is illustrated further in the following examples:

*Example 1*

Dimethallyl isophthalate was prepared as follows: A mixture of 21 grams of essentially anhydrous disodium isophthalate, 84 grams of methallyl chloride and 0.41 gram (0.0023 mole) of allyltriethylammonium chloride (added as a fifty percent solution in isopropyl alcohol) was heated and agitated in a stainless steel reaction vessel at 115° C. Portions of the reaction mixture were analyzed every 20 minutes, to determine the percent conversion with time. After a total of 1.5 hours the reaction was stopped, at a final conversion to dimethallyl isophthalate of 93%.

A control reaction was run with a tertiary amine catalyst, as follows: A mixture of 21 grams of essentially anhydrous disodium isophthalate, 84 grams of methallyl chloride and 0.23 gram (0.0023 mole) of triethylamine (added as a fifty percent solution in isopropyl alcohol) was heated and agitated in a stainless steel reaction vessel at 115° C. Portions of the mixture were withdrawn and analyzed periodically. After a total of 2 hours the reaction was stopped, at a final total conversion of 42%.

The results of these runs are shown in curves I and IV of the accompanying drawing. The rate increase due to the allyltriethylammonium chloride is apparent.

*Example 2*

Dimethallyl orthophthalate was prepared as follows: A mixture of 21 grams of disodium phthalate, 84 grams of methyallyl chloride and 1.24 grams (0.007 mole) of allyltriethylammonium chloride (added as a fifty percent solution in isopropyl alcohol) was heated at 115° C. for one hour. The mixture was allowed to cool and was agitated with 100 ml. of water. The aqueous phase was separated, and the organic phase was again washed with 100 ml. of water. The organic phase was separated and distilled at reduced pressure, to give 24.6 grams, a 90% conversion of dimethallyl orthophthalate. Repeating this experiment, employing methallyltriethylammonium chloride as catalyst, yielded a 93% yield of dimethallyl phthalate after 1 hour.

For comparison, the above procedure was repeated employing triethylamine as catalyst. A mixture of 21 grams of disodium phthalate, 84 grams of methallyl chloride and 0.71 gram (0.007 mole) of triethylamine (added as a fifty percent solution in isopropyl alcohol) was heated and agitated at 115° C. for one hour. The reaction mixture was purified as described above, and there was obtained 3.4 grams of dimethallyl phthalate, a 12.5% conversion.

It is seen that, at these higher catalyst concentrations (7 mole percent), the accelerating effect of the quaternary ammonium salt is even more striking.

*Example 3*

Dimethallyl isophthalate was prepared as follows: A mixture of 21 grams of essentially anhydrous disodium isophthalate, 84 grams of methallyl chloride and .44 gram (0.0023 mole) of methallyltriethylammonium chloride (added as a fifty percent solution in isopropyl alcohol) was heated and agitated at 115° C. The reaction mixture was analyzed periodically. At the end of two hours, analysis showed a final yield of 75% of theoretical.

Repeating the above reaction and procedure, employing 0.41 gram (0.003 mole) of alllyltrimethylammonium chloride as catalyst, produced after 2 hours 45% of the theoretical yield of dimethallyl isophthalate.

These data are presented in curves II and III in the accompanying drawing. It is seen that use of methallyltriethylammonium chloride provides a fairly rapid rate at a concentration of 2.3 mole percent (curve II), and that allyltrimethylammonium chloride, even at a higher concentration (curve III), is not much more effective than is the tertiary amine illustrated by curve IV.

*Example 4*

Dimethallyl isophthalate was prepared as follows: A mixture of 21.0 grams of essentially anhydrous disodium isophthalate, 84 grams of methallyl chloride and 0.62 gram of benzyltriethylammonium bromide was heated and agitated at 115° C. for three hours. At the end of this time, the mixture was cooled and the solids were removed by filtration. The filter was washed with additional methallyl chloride, and the washings were added to the original filtrate. Distillation of the combined filtrates afforded 22 grams (80 percent conversion) of dimethallyl isophthalate.

It is apparent that in the synthesis of dimethallyl phthalate, results obtained with quaternary catalysts are substantially superior to those obtained with tertiary amine catalysts, and that the instant process provides novel and unexpeced advantages over processes heretofore known for the synthesis of dimethallyl phthalates.

The dimethallyl phthalates prepared herein are useful monomers for the preparation of synthetic resins, and may be polymerized and copolymerized to form thermoplastic polymers having residual unsaturation, and cross-linked thermoset resins of superior electric and mechanical properties.

We claim:

1. The method of producing dimethallyl phthalates which comprises reacting one molar equivalent of the alkali metal salt of an unsubstituted phthalic acid with two molar equivalents of methallyl chloride in the presence of a catalyst selected from the group consisting of allyltriethylammonium halide, methallyltriethylammonium halide and benzyltriethylammonium halide, under substantially anhydrous conditions, at a temperature and time to convert said phthalic acid salt and methallyl chloride into the corresponding dimethallyl phthalate, and separating the dimethallyl phthalates thus produced.

2. The method of producing dimethallyl phthalates which comprises reacting one molar equivalent of the alkali metal salt of an unsubstituted phthalic acid with two molar equivalents of methallyl chloride, in the presence of allyltriethylammonium chloride catalyst, under substantially anhydrous conditions, at a temperature and time to convert said phthalic acid salt and methallyl chloride into the corresponding dimethallyl phthalate, and separating the dimethallyl phthalate thus produced.

3. The method of producing dimethallyl phthalates which comprises reacting one molar equivalent of the alkali metal salt of an unsubstituted phthalic acid with two molar equivalents of methallyl chloride, in the presence of methallyltriethyammonium chloride catalyst, under substantially anhydrous conditions, at a temperature and time to convert said phthalic acid and methallyl chloride into the corresponding dimethallyl phthalate, and separating the dimethallyl phthalate thus produced.

4. The method of producing dimethallyl phthalates which comprises reacting one molar equivalent of the alkali metal salt of an unsubstituted phthalic acid with two molar equivalents of methallyl chloride, in the presence of benzyltriethylammonium chloride catalyst, under substantially anhydrous conditions, at a temperature and time to convert said phthalic acid and methallyl chloride into corresponding dimethallyl phthalate, and separating the dimethallyl phthalate thus produced.

5. The method of producing dimethallyl orthophthalate which comprises reacting one molar equivalent of disodium orthophthalate with two molar equivalents of methallyl chloride in the presence of a catalyst selected from the group consisting of allyltriethylammonium halide, methallyltriethylammonium halide and benzyltriethylammonium halide, under substantially anhydrous conditions, at a temperature and time to convert said disodium phthalate and methallyl chloride into dimethallyl orthophthalate, and separating the dimethallyl orthophthalate thus produced.

6. The method of producing dimethallyl isophthalate which comprises reacting one molar equivalent of disodium isophthalate with two molar equivalents of methallyl chloride in the presence of a catalyst selected from the group consisting of allyltriethylammonium halide, methallyltriethylammonium halide and benzyltriethylammonium halide, under substantially anhydrous conditions, at a temperature and time to convert said disodium isophthalate and methallyl chloride into dimethallyl isophthalate, and separating the dimethallyl isophthalate thus produced.

7. The method of producing dimethallyl phthalates which comprises reacting one molar equivalent of the disodium salt of an unsubstituted phthalic acid with two molar equivalents of methallyl chloride in the presence of allyltriethylammonium chloride, under substantially anhydrous conditions, at a temperature and time to convert said disodium phthaate and methallyl chloride into the corresponding dimethallyl phthalate, and separating the dimethallyl phthalate this produced.

8. The method of producing dimethallyl phthalate which comprises reacting one molar equivalent of the disodium salt of an unsubstituted phthalic acid with two molar equivalents of methallyl chloride in the presence of methallyltriethylammonium chloride, under substantially anhydrous conditions, at a temperature and time to convert said disodium phthalate and methallyl chloride into the corresponding dimethallyl phthalate, and separating the dimethallyl phthalate thus produced.

References Cited in the file of this patent

FOREIGN PATENTS 544,032    Canada _____ July 23, 1957

OTHER REFERENCES

Fieser and Fieser: "Organic Chemistry," pages 711–12, D. C. Heath and Co., Boston, 1950.